US009727830B2

(12) United States Patent
Gonzalez et al.

(10) Patent No.: US 9,727,830 B2
(45) Date of Patent: Aug. 8, 2017

(54) MULTI-TIER EMPLOYMENT MODEL FOR HUMAN CAPITAL MANAGEMENT

(75) Inventors: Irene Gonzalez, Lake Mary, FL (US); Roderic Michael Fine, Oxon (GB); John Neil Thuringer, Middlesex (GB); Adrian Hunter, Middlesex (GB); Jon MacGoy, Potomac Falls, VA (US); Neil Bristow, Berkshire (GB); Daniel Matlin, Dublin, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1384 days.

(21) Appl. No.: 12/268,836

(22) Filed: Nov. 11, 2008

(65) Prior Publication Data

US 2009/0125486 A1      May 14, 2009

Related U.S. Application Data

(60) Provisional application No. 60/987,317, filed on Nov. 12, 2007.

(51) Int. Cl.
*G06Q 10/06* (2012.01)
(52) U.S. Cl.
CPC ........... *G06Q 10/06* (2013.01); *G06Q 10/067* (2013.01)
(58) Field of Classification Search
USPC .......................................................... 805/9
See application file for complete search history.

(56) References Cited

U.S. PATENT DOCUMENTS

| 5,655,118 | A | * | 8/1997 | Heindel et al. | 705/7.17 |
| 7,454,435 | B2 | * | 11/2008 | Friedman et al. | |
| 2006/0253470 | A1 | * | 11/2006 | Friedman et al. | 707/100 |
| 2008/0109299 | A1 | * | 5/2008 | Khetarpal et al. | 705/11 |
| 2010/0287555 | A1 | * | 11/2010 | Thormaehlen | G06Q 10/06 718/102 |
| 2014/0058801 | A1 | * | 2/2014 | Deodhar | G06Q 10/0639 705/7.38 |
| 2017/0116552 | A1 | * | 4/2017 | Deodhar | G06Q 10/06316 |

* cited by examiner

*Primary Examiner* — Leland Marcus
(74) *Attorney, Agent, or Firm* — Kilpatrick Townsend & Stockton LLP (57) ABSTRACT

A three-tier employment model provides flexibility when modeling even moderately complex relationships, such as where an employee has multiple job tasks or assignments for an employer. In such an example, a top level can store information for each employee defining the type of relationship that exists between the employee and the employer, such as where the employee works for multiple entities of the employer. A middle level can capture employment terms and conditions that are associated with the relationship(s), as well as one or many work assignments, such as salary information for each assignment. A bottom level can store the actual details of the work to be performed. A three-tier approach thus provides significant flexibility in modeling the employment of a person for an enterprise, and allows companies and enterprises to easily record the reality of their complex work relationships.

21 Claims, 9 Drawing Sheets

- Prior Art -

MULTI-TIER EMPLOYMENT MODEL FOR HUMAN CAPITAL MANAGEMENT

CROSS-REFERENCES TO RELATED APPLICATIONS

This application is a non-provisional and claims the benefit of commonly assigned U.S. Patent Application No. 60/987,317 entitled "MULTI-TIER EMPLOYMENT MODEL FOR HUMAN CAPITAL MANAGEMENT", filed on Nov. 12, 2007, the entire disclosure of which is herein incorporated by reference for all purposes.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

In today's human capital management (HCM) environment, companies are facing more complex employment conditions that require better and more granular control and flexibility. This need is especially important for those businesses which must comply with statutory regulations. Statutory requirements may involve aggregating work assignments, handling benefits across assignments, and/or managing workers who may have multiple assignments under one or more employment contracts.

These complex employment conditions are generally encountered in public sector, healthcare, and retail organizations. Some of the organizations that face the complex employment situations are enterprises that consist of multiple employing entities. The employing entities may be several subsidiaries or business units. The business units may be located in several countries with each country having certain rules about employment. The workforce may include employees that are concurrently employed by more than one business unit. The multiple employers for an employee can result in frequent changes in working conditions. The multi-national conglomerates are generally regulated with a great amount of vigor. Further, the companies may also face demands on the terms and conditions of employment, from compensation rates to progression, based on collective or individual employment agreements and/or industry regulations.

Figure 1:
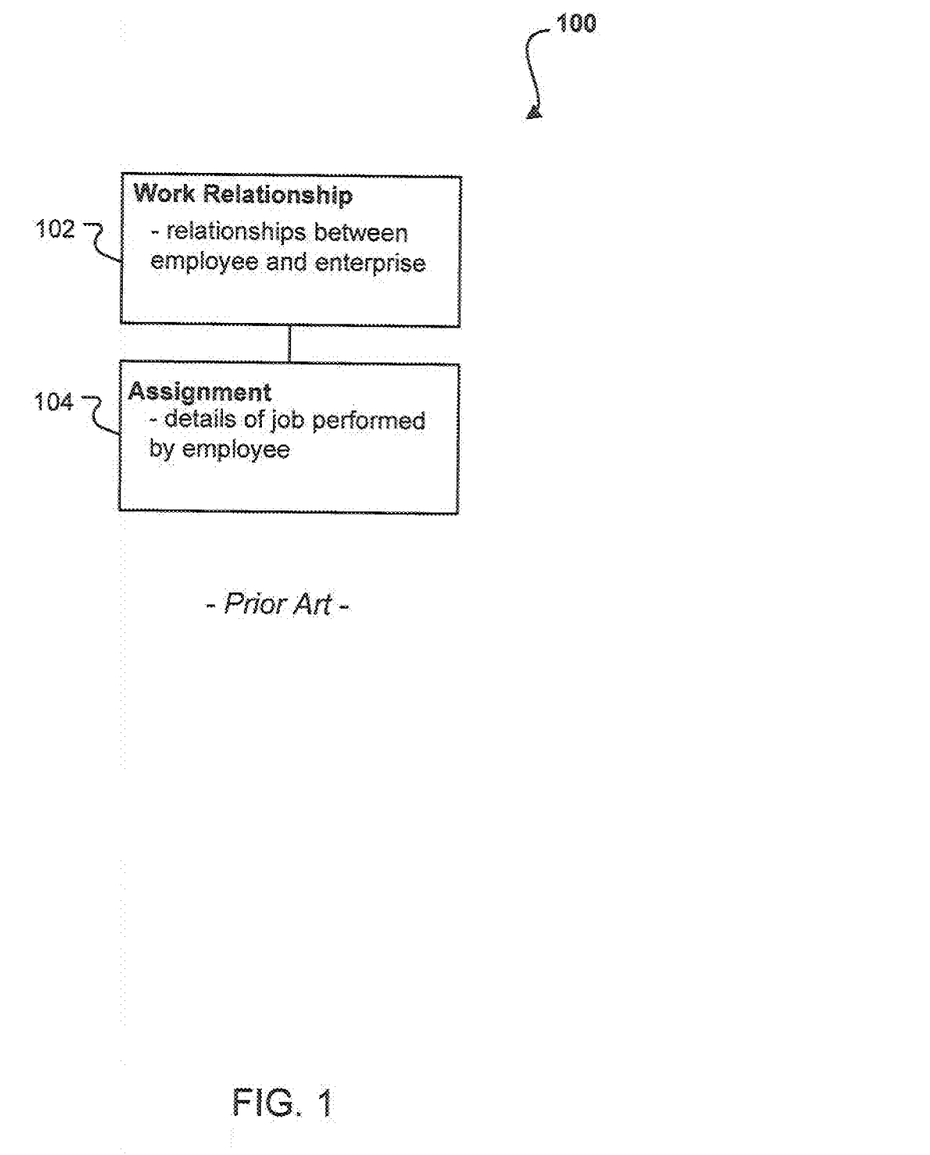
FIG. 1 is a block diagram of a two-tiered employment model.

Traditionally, the employment of a person has been modeled as a two-tier system 100 as shown in FIG. 1. The two-tier systems are designed to handle two levels. A first level of the system is identified as a work relationship level 102, which is designed to store details of the relationship between the person and the enterprise. For example, the first level stores information that a person is an employee of a particular legal entity and over a specific period of time. A second level of the system is identified as an assignment level 104, which is designed to store details of the job performed by that person. This two-tier system is insufficient for various enterprises.

Not all of the complexities of employment situations can be easily managed using current solutions, such as the two-tier system. For instance, at least one current solution allows customers to store one or more assignments for a person and allows a legal contract to be noted against each of these assignments. However, this solution does not allow for the creation of one or more fully articulated sets of employment terms, which can be associated to one or more assignments. Moreover, these solutions do not allow customers to define what an assignment or a work contract actually means to a specific business and thus provides an unduly rigid approach to what is recorded against each assignment.

It is in light of these and other considerations that the present application is being presented.

SUMMARY

Embodiments presented herein provide a three-tier employment model. The three-tier employment model can provide flexibility when modeling even moderately complex relationships, such as when an employee has multiple job tasks or assignments for an employer. In such an example, the top level of the employment model can store information for each employee defining the type of relationship that exists between the employee and the employer. A middle level of the model can capture employment terms and conditions that are associated with the each of the relationship(s) and can capture information about the one or more work assignments (e.g., the salary information for each assignment). A bottom level of the employment model can store the actual details of the work to be performed. The embodiments of the three-tier employment model can provide significant flexibility in modeling the employment of a person for an enterprise and allow companies and enterprises to easily record and manage complex working relationships.

This summary is meant only to provide a brief description of one or more embodiments. In no way is this summary meant to limit the scope of the embodiments. The invention is as presented in the claims.

BRIEF DESCRIPTION OF THE DRAWINGS

Various embodiments in accordance with the present invention will be described with reference to the drawings, in which.

DETAILED DESCRIPTION

Systems and methods in accordance with various embodiments overcome the aforementioned and other deficiencies in existing information management systems. In embodiments, a three-tier employment model provides flexibility that is needed in certain situations for various enterprises. For example, a three-tier employment model can be used to describe complex employment scenarios for an enterprise. Although the various embodiments will be described with respect to an employment application, it should be understood that such an implementation is merely exemplary. The features and advantages of the various embodiments can be used with various other systems and applications. These features and advantages will be readily apparent to one of ordinary skill in the art in light of the description contained herein.

Figure 2:
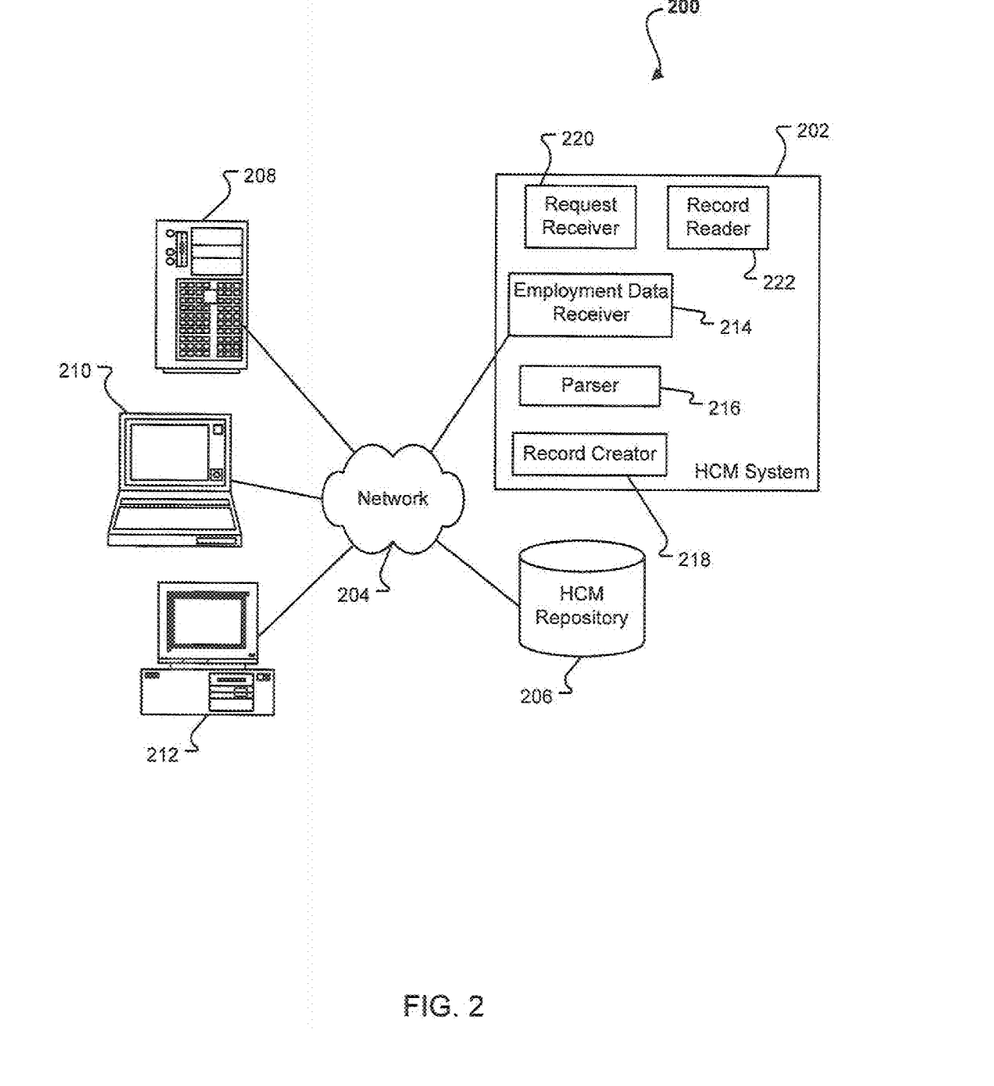
FIG. 2 is a block diagram of an embodiment of a human capital management (HCM) system.

An embodiment of a system 200 for managing employment data is shown in FIG. 2. An example of the system 200 is the PeopleSoft Human Capital Management (HCM) available from Oracle Corporation of Redwood Shores, Calif., which is an application for performing human resources-related functions such as tracking employee and job information. An employee transaction can be submitted through, for example, a laptop 210, a desktop computer 212, or a server 208. The transaction can be submitted from one or more transaction applications, where the transaction passes through an appropriate network 204 and is received by the HCM system 202. The network is a local area network (LAN), a wide area network (WAN), the Internet, or other network.

An HCM system 202 is hardware, software, or hardware and software for processing transactions. An HCM system 202 stores information in an HCM repository 206. The HCM repository 206 is a database or other storage system that may be stored on a computer-readable medium. The HCM system 202 can also include one or more components for storing or retrieving employment data. In one example, the HCM system 202 includes an employment data receiver 214 for receiving employment data, a parser 216 to determine the type of employment data, and a record creator 218 that can store the data into one of three types of data records. The three types of data records are associated with the three tiers of the employment data model as explained in conjunction with FIGS. 3-5. In another example, the HCM system 202 includes a request receiver 220 to receive a request for employment data, a parser 216 to determine the type of employment data request, and a record reader 222 that can read the data from the three types of data records.

While various embodiments will be described with respect to employees, it should be understood that HCM systems 202 often make distinctions between types of employees or classes of persons. For example, an employee may be different from a contingent worker because a categorical distinction is made due to the legal implications in various countries. Systems might also distinguish between classes, for example, regular workers, temporary employees, independent contractors, etc. For purposes of simplicity, the following description refers to "employees" generally, but it should be understood that this is a generic term for these various classes and categories and should not be interpreted to only represent one such class or category of employee. For purposes of this application, an employee can mean employees or other classes of people who have a work relationship with the enterprise, and employment terms, as used herein, can mean a set of terms or conditions applied to employees or other workers.

Figure 3:
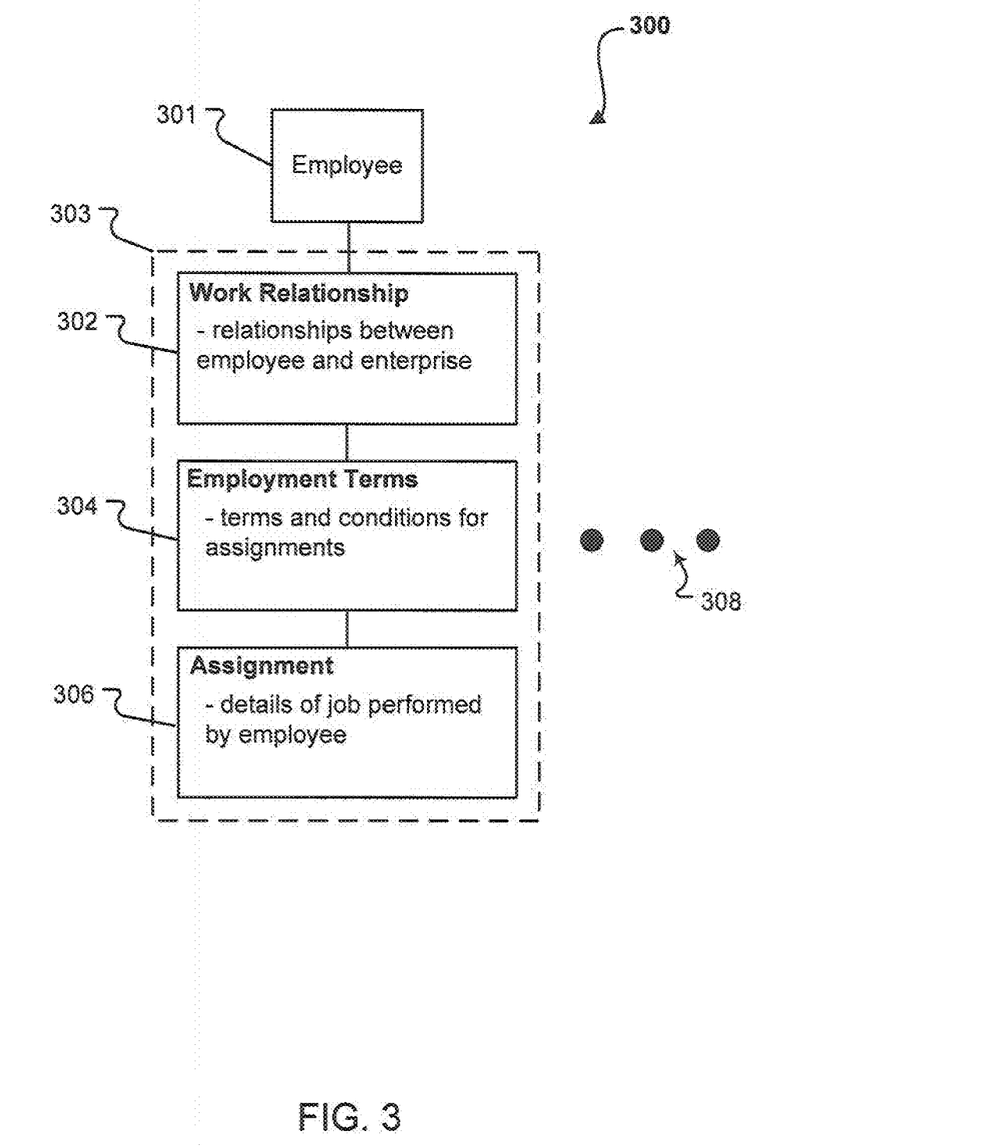
FIG. 3 is a block diagram of an embodiment of a three-tier employment model.

A three-tier employment model 300 for employee information is shown in FIG. 3. The three-tier employment model 300 provides more flexibility when modeling even moderately complex relationships between an individual employee and an enterprise employer. Three-tier employment model 300 can include at least three levels, referred to herein as a work relationship level 302, an employment terms level 304, and an assignment level 306. In alternative embodiments, one or more of the three levels may have a different designation. Further, two or more levels may be combined into an overarching file but still contain information for the two or more levels. For example, an employment terms level may be the designation for the employment terms level 304 and the assignment level 306.

The three-tier employment model 300 comprises one or more records 303 for each employee 301. As such, each employee can have one or more records 303 defining one or more work relationships, as shown by ellipses 308. The work relationships are defined by the work relationship level 302. A relationship level, such as the work relationship level 302, is the highest level in the record 303 that exists for each worker residing within a "legal entity". A legal entity is any enterprise unit or a designation that defines a separate portion of the enterprise. The designation of a portion of the enterprise may be defined by one or more legal requirements. For example, a distributor may be a wholly-owned subsidiary of a parent holding company, and the distributor can have a separate designation for the records.

The work relationship level 302 holds information regarding the type of relationship that exists between the person and the enterprise. For example, the work relationship level 302 holds information about an employee's relationship with the distributor as opposed to the employee's relationship with the parent company. If an employee 301 works for two legal entities within an enterprise, then each of the relationships can be recorded separately in separate records 303. For example, a person who works for two different franchises of a restaurant chain on different shifts can have each relationship recorded separately.

Employment terms level 304 is the second or "middle" level of the exemplary employment model 300. The employment terms level 304 can capture the employment terms that are associated with one or more assignments. Employment terms can mean any terms or conditions of employment, for example, salary, work hours, vacation, etc., for an employee. It should be noted that an employee may have employment terms while a contingent worker can have placement terms. Hereinafter, employment terms can be used to mean terms for any type of employee. Thus, for every relationship governed by the work relationship level 302, an employee can have one or more assignments governed by the employment terms level 304. For instance, a substitute teacher who has a single set of terms with a school district may work in several schools on different days of the week. One assignment would be created for each school, allowing recordation of the location and type of work each day, while employment conditions such as grade and salary are fixed at the employment terms level 304. An employee can also have two assignments, each with different employment terms. For example, the employee working for a restaurant franchise may have an assignment as a janitor and an assignment as a cook. Each of these assignments may have different terms, e.g., pay scale, hours, vacation, etc.

Enterprises using the employment model 300 (hereinafter referred to as "customers") have the flexibility to define what each customer regards as belonging at this employment terms level 304 for their business. Customers also have the flexibility of deciding which aspects are unchangeable and which aspects can be overridden at the assignment level 306. What is overwritten at the assignment level 306 can be governed by one or more configurable rules defined by the customer in the assignment level 306 or the employment terms level 304. As an example, a customer may decide that both salary and grade are enterable at the employment terms level 304, and salary cannot be changed for each individual assignment. In contrast, the customer may decide that grade can be overridden at the lower assignment level 306 on a case-by-case basis. Rules can be defined at this employment terms level 304 to govern the behavior at a lower assignment level 306. This approach supports aggregating assignments, and thereby reducing efforts when reporting or determining information or data across multiple jobs for multiple workers.

On the other hand, the three-tiered employment model 300 also provides the ability to distinguish between different sets of terms that can be associated to specific work relationships. For instance, a full-time, salaried employee work relationship will have one or more sets of employment terms and a contingent worker relationship will have one or more different sets of employment terms. Such an approach is particularly advantageous when a person has two distinct work relationships with the same employer. For example, the three-tiered employment model 300 can define a person who has two work contracts with a school, one as a teacher and one as a part-time secretary. Each work relationship can have its own set of terms and conditions, for example, one set of terms dictated by union agreements and one for terms not based on a union agreement.

The assignment level 306 is the lowest level of this employment model 300, and is designed to store the details of the work to be performed. A person may have more than one assignment for each set of employment terms. For instance, a substitute teacher who has a single set of terms with a school district may work in several schools on different days of the week. One assignment would be created for each school, allowing recordation of the location and type of work each day, while employment conditions such as grade and salary are fixed at the employment terms level 304.

Besides representing human resources (HR) functions using such a three-tier approach, other applications can transform the employment tiers into a form that is independent and structured to specific needs. For instance, a payroll application can have a payment relationship grouping employment terms. Further, the assignments for the employee may be represented in a different manner that is suitable to the enterprise's or application's needs. The payment relationship entity is associated with taxation information. Thus, a new work relationship (e.g., for the same legal employer on a rehire) may not result in a new payment relationship. The United States, for example, treats a rehire as a continuation of the prior payment relationship, while other countries that have tax cards (Form P45, etc.) may treat this rehire as a new payment relationship.

Accordingly, the implementation of such a three-tier model may vary by country, industry, or customer. For example, outside the public sector in the United States, most companies do not make a distinction between employment terms and assignments. The most complex employment models are likely to be used in the public sector, unionized, or contractually-based businesses. The employment model customer is given the ability to decide exactly which fields are available at each level and which overrides are allowed from level to level. Also, the system can allow customers to hide the employment terms level if this is not required to be modeled separately from the assignment level.

Figure 4:
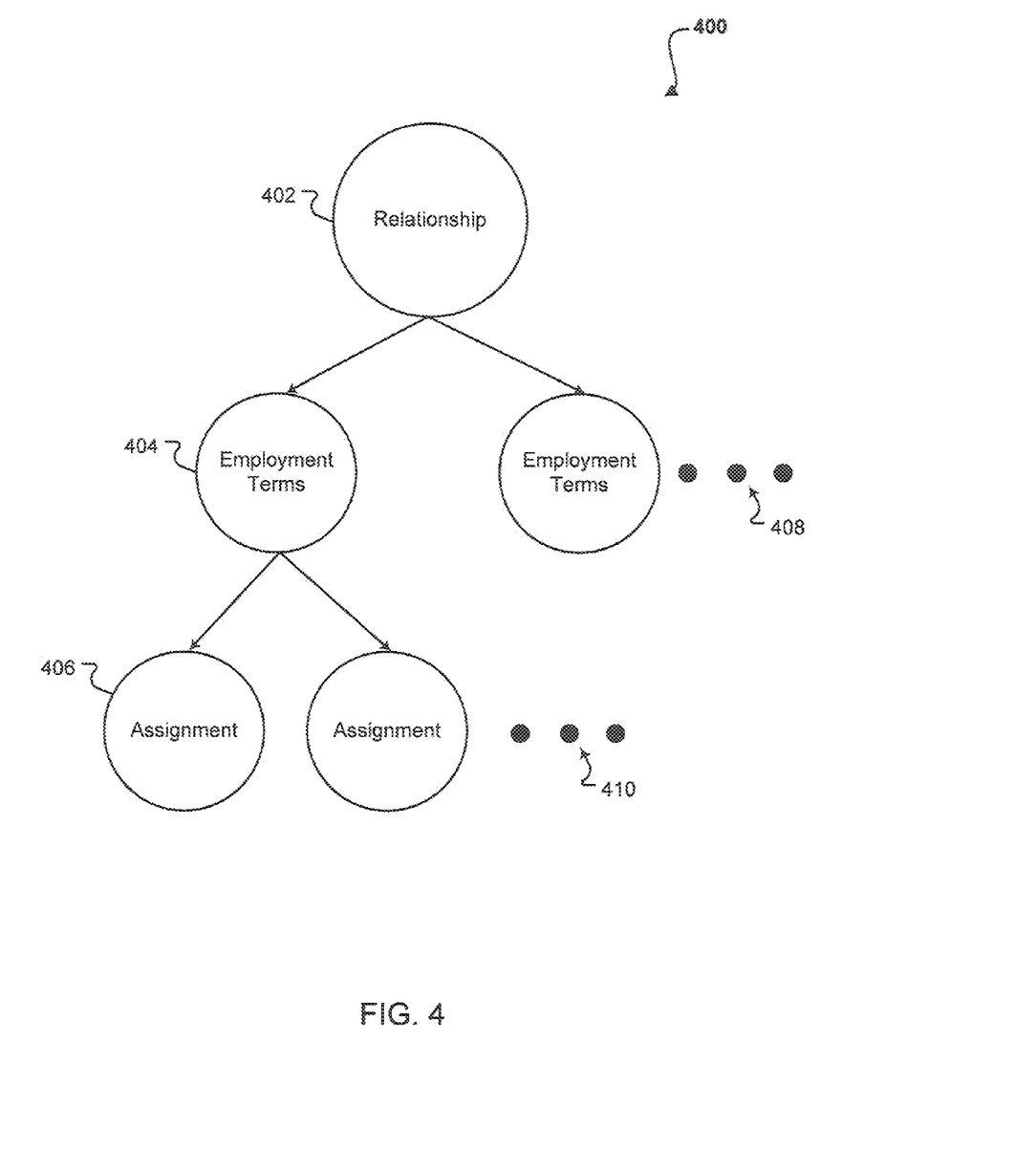
FIG. 4 is a block diagram of an embodiment of a hierarchy for a three-tiered employment model.

An embodiment of a hierarchical, tiered employment model 400 is shown in FIG. 4. The tiered employment model 400 may be the same or similar to the employment model 300 described in conjunction with FIG. 3. The employment model 400 may have three tiers including a relationship level 402, an employment terms level 404, and an assignment level 406. These levels are the same or similar to the levels described in conjunction with FIG. 3. Each employee may have one or more employment models 400 as shown in FIG. 4. Thus, each employee may have one or more work relationships as governed by the relationship level 402. For each relationship, one or more sets of employment terms 404 may be associated with the work relationship 402. There may be more or fewer sets of employment terms than those shown in FIG. 4, as represented by the ellipses 408. Further, each set of employment terms 404 may have one or more sets of assignments 406. There may be more or fewer sets of assignments than those shown in FIG. 4, as represented by the ellipses 410. Each level can provide terms to a parent or higher level or inherit terms or conditions from a parent or higher level. As such, the three-tiered employment model 400 provides a flexible model able to adjust to various employment scenarios.

As another example, a construction firm can employ a construction worker and, as part of the employment agreement, the construction worker is employed as a salaried employee and paid on a monthly basis. Within that construction job, the worker might be assigned three days a week to work for customer A as a plumber and may be assigned to work for customer B for 2 days a week as a carpenter. As part of those assignments, the worker might be entitled to different overtime rates for each job. To further complicate the example, the worker could accept a part-time office job with the company on weekends for extra money. In this example, the employee can have two contracts, each of which gets paid a salary, and within one of the contracts the worker has two jobs that each have certain benefits and wages. The overarching mechanism from a payroll point of view is the fact that all of the jobs for the employee can be viewed as a single unit for taxes. From a benefits perspective, the two jobs under the same contract may equate to a full time position, such that the employee is able to receive benefits as a full time employee, although each job assignment is only part time. Such an approach also allows the customer to maintain separate information for each of the job assignments under each contract. The three-tier approach thus allows enterprises to make the distinction between an employment terms layer and a work assignment layer for those customers for whom such a distinction is important.

Figure 5:
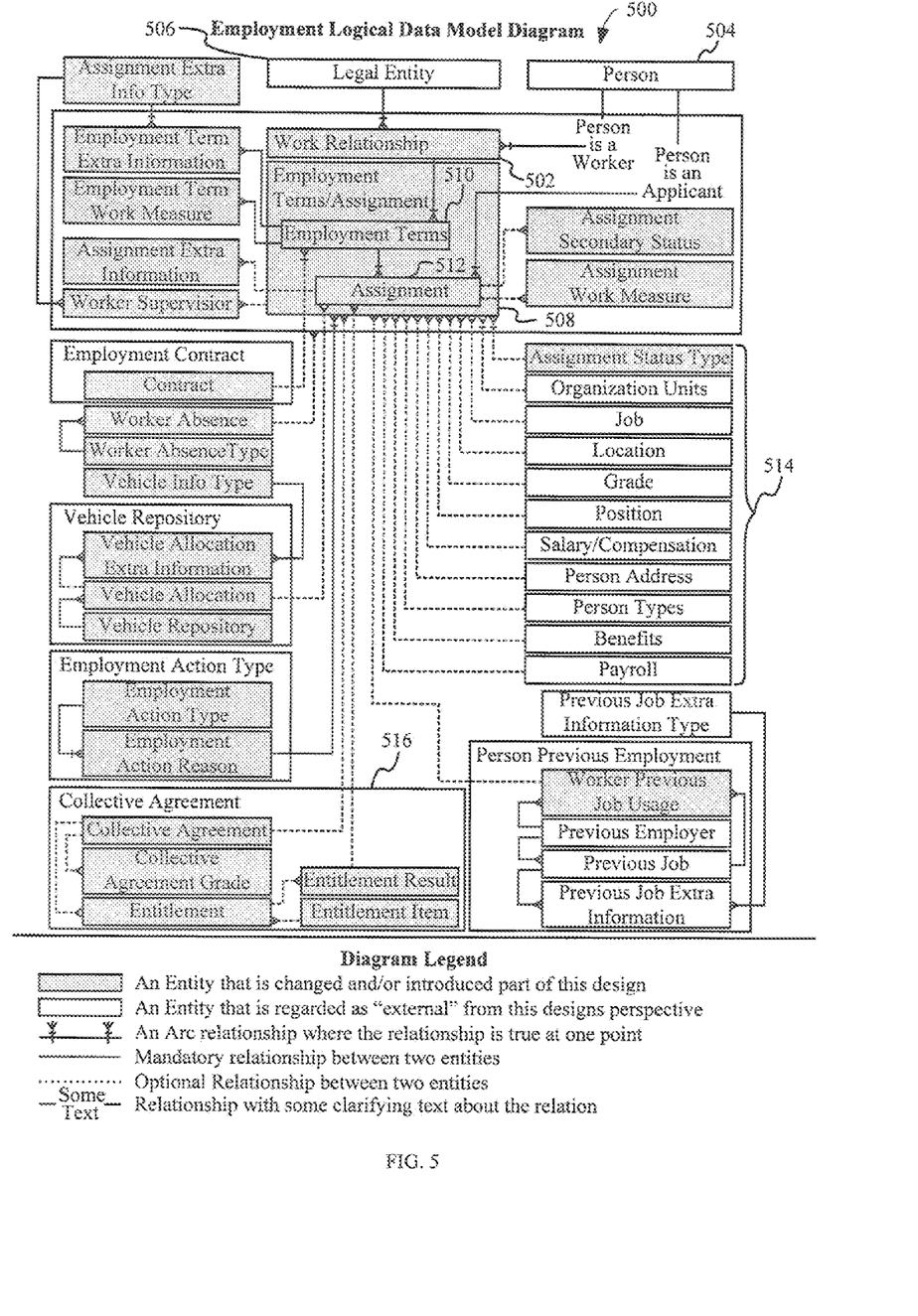
FIG. 5 is a relationship diagram of an embodiment of an employment data model.

An embodiment of a three-tiered employment model 500 is shown in FIG. 5. The three-tiered employment model 500 can be the same or similar to the three-tiered models as described in conjunction with FIGS. 3 and 4 but may represent the data structure of the three-tiered employment model. The three-tiered employment model 500 is a database storing information in a logical relationship. In embodiments, the database is a relational database, a flat file database, etc. The three-tiered employment model 500 includes a parent table 502 (here "work relationship") that stores information related to the work relationship, such as a start date, hire date, termination date, and other such relevant information. The work relationship table 502 can be associated with a person 504 (the employee) and a legal entity 506 (e.g., the enterprise or business).

The bottom two tiers of the three-tiered employment model can be set forth in two additional tables. In at least one embodiment, the bottom two tiers are advantageously provided in a single child table 508 (here "employment terms/ assignments"). However, as can be seen, the employment terms/assignments table 508 includes an employment terms table 510 that can identify the employment terms and an assignment table 512 that can identify the assignments. The employment terms/assignments child table 508 can provide a one-to-many relationship. As within any work relationship in the parent table, there can be different jobs with different sets of employment terms for each relationship. In such a case, there can be two rows in the employment terms/assignments table 508 containing different sets of employment terms. From a logical standpoint, each row, in the employment terms/assignments table 508 or 510, containing those sets of terms then becomes a parent to at least one assignment represented by a row or a table in the assignment table 512. Thus, instead of having the relationships between the assignment 512 and the work relationship 502, a one-to-many relationship can be established between the employment terms 510 and the assignments 512. At a data level, since the employment terms 510 and assignments 512 are capturing similar attributes that describe a job, a single table 508 can be used to store both levels 510 and 512.

The employment terms/assignments child table 508 can be defined and/or typed in a way that maintains a relationship between the employment terms and the assignments, allowing the employment terms 510 and assignments 512 to be held and differentiated by the system according to a type that indicates whether the record is for employment terms 510 or assignments 512. A "pig's-ear" type relationship can be maintained on the table 508, whereby each assignment record 512 is a child of an employment terms record 510 in the same table 508. The HCM system can include code to handle the parent-child relationship in the employment terms and assignments table 508. For example, there may be a pointer or link between the tables 510 and 512 to establish the parent-child relationship. In other embodiments, a set of identifiers recorded in the data files may recognize the rows or records in the tables 510 and 512 as having a parent-child relationship. For example, an identifier stored in a first row of the employment terms table 510 may also be stored in a parent table field of a row in the assignment table 512. The inclusion of the identifier in the assignment table 512 can establish the parent-child relationship.

Such an approach can also allow for different groupings between applications, which may not be shown in FIG. 5. For example, the top layer can be grouped by employer, legal entity, statutory unit, etc. Terms also can be grouped differently, such as may be necessary for payroll applications in different countries, for example. The three-tier approach provides significant flexibility in modeling the employment of a person for an enterprise and allows companies and enterprises to easily record the reality of their complex work relationships. Further, such an approach provides a way to easily merge information in the case of continuing consolidation of businesses (e.g., mergers and acquisitions), which increases the number of enterprises with multiple legal employers, both within and across many countries. Such a solution also offers integration with other applications (e.g., payroll and benefits applications) making the three-tiered model a relatively robust and complete solution. As discussed above, such an approach can be used with Oracle® Human Capital Management (HCM), for example, which is a major component of the Oracle® E-Business Suite of applications. Oracle HCM is an integrated suite of applications that supports all aspects of the HR function. The Oracle HCM applications support enterprise's structures and policies and the requirements of a global workforce. For example, HCM manages information in a variety of national languages and supports multiple address styles, legislation-specific date formats, and national identifiers (such as social security numbers), which can be validated according to the rules in each country.

Figure 6:
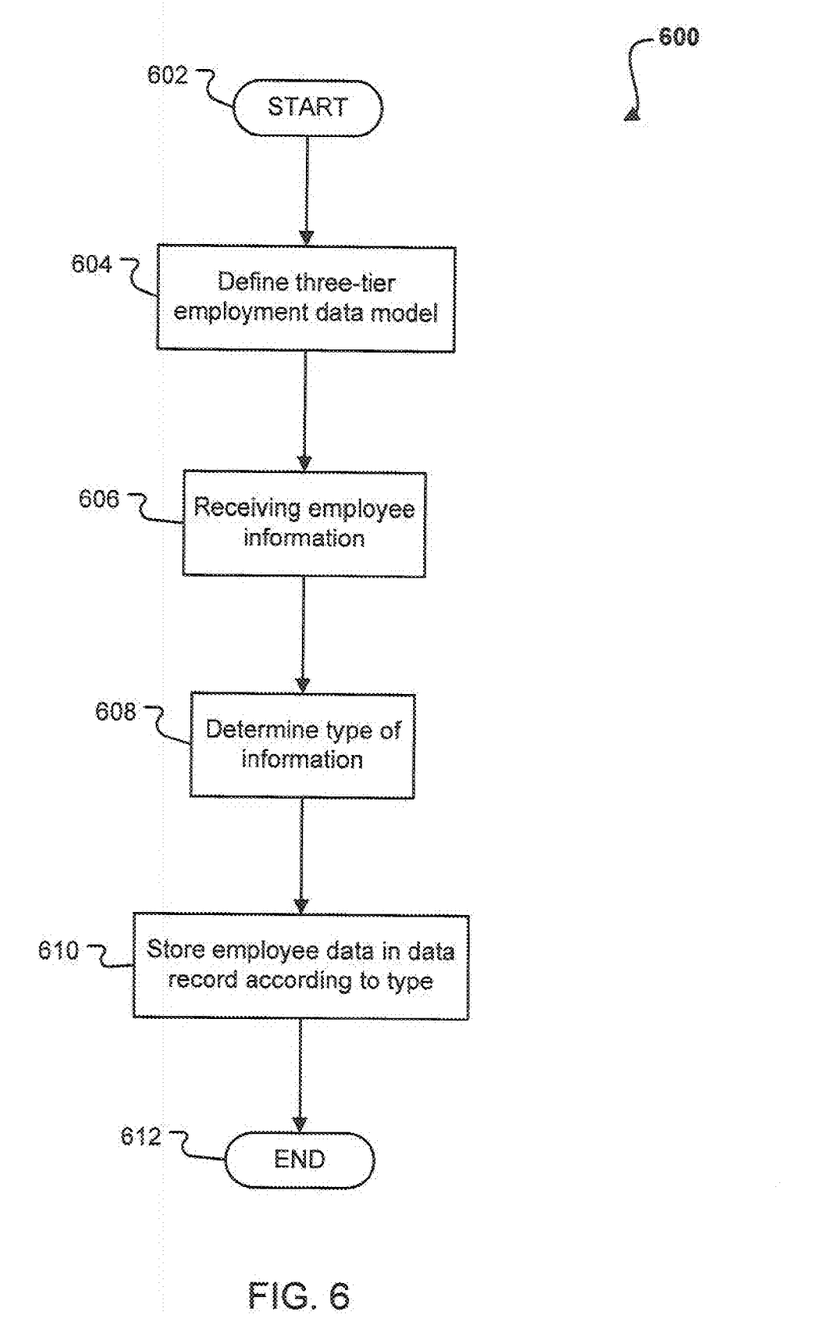
FIG. 6 is a flow diagram of an embodiment of a method for storing data in a three-tiered employment model.

An embodiment of a method 600 for creating a three-tiered employment model is shown in FIG. 6. The method 600 may be explained in reference to the systems or data structures presented in FIGS. 1-5. The method 600 begins with a start operation 602 and terminates with an end operation 612. While a logical order is shown in FIG. 6, the steps within method 600 may have additional steps or may be conducted in a different sequence. The method 600 can be conducted as one or more computer instructions executed by a computer processor.

The HCM system 202 (FIG. 2) defines a three-tiered employment model 300 (FIG. 3) in step 604. The HCM system 202 (FIG. 2) can define a work relationship level 302 (FIG. 3), an employment terms level 304 (FIG. 3), and an assignment level 306 (FIG. 3) for one or more employees. The three-tiered employment model 300 (FIG. 3) may be altered or modified by the user through interaction between a user computer application 208 (FIG. 2) and the HCM system 202 (FIG. 2). The record creator 218 (FIG. 2) of the HCM system 202 (FIG. 2) can create the several records for the three-tiered employment model 300 (FIG. 3) to create the three-tiered employment model database 500 (FIG. 5).

The record creator 218 (FIG. 2) may receive one or more items of information about the employee and the employment relationship in step 606. The user can send the employment information from a user application 208 (FIG. 2) to the HCM system 202 (FIG. 2). The record creator 218 (FIG. 2) can receive the information to populate the three-tiered employment model database 500 (FIG. 5). The record creator 218 (FIG. 2) may send the information to a parser 216 (FIG. 2) to determine the type of information received in step 608. The parser 216 (FIG. 2) may determine whether the received information is associated with the work relationship level 502 (FIG. 5), the employee information 504 (FIG. 5), the employment terms level 510 (FIG. 5) or the assignment level 512 (FIG. 5). The parser 216 (FIG. 2) may receive the information through one or more forms created for data entry where different fields in the form are associated with different types of data. As such, the parser can simply determine in what field of the form the data was entered. In other embodiments, the parser 216 (FIG. 2) can receive an identifier or indicator for the type of data. For example, the received message may include an identifier for the table 502, 510, or 512 (FIG. 5) that should receive the data. The parser 216 (FIG. 2) may also understand that data representing an employee address is associated with the person table 504 (FIG. 5).

In response to determining the type of data, the record creator 218 (FIG. 2) stores the employment data in the three-tiered employment model database 500 (FIG. 5) according to the determined data type in step 610. For example, the information about the employee may go in the person record 504 (FIG. 5). Further, job information may be recorded in one or more fields 514 (FIG. 5) of the assignment table 512 (FIG. 5). Information regarding a union agreement may be recorded in the collective agreement record 516 (FIG. 5). Thus, all information regarding the employment of the employee may be recorded in one or more fields or records of the three-tiered employment model database 500 (FIG. 5).

Figure 7:
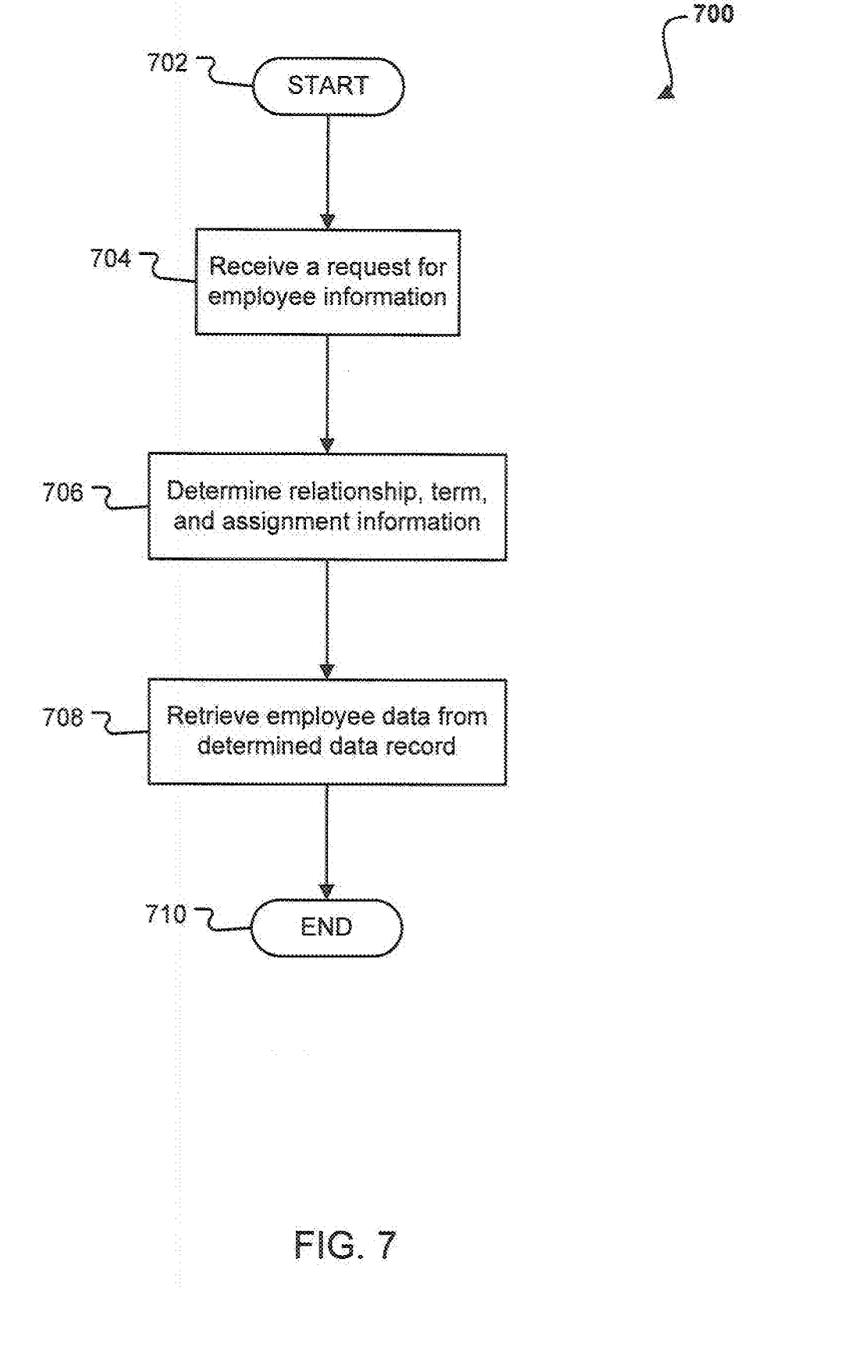
FIG. 7 is a flow diagram of an embodiment of method for retrieving data in a three-tiered employment model.

An embodiment of a method 700 for retrieving or reading employment information from a three-tiered employment model is shown in FIG. 7. The method 700 may be explained in reference to the systems or data structures presented in FIGS. 1-5. The method 700 begins with a start operation 702 and terminates with an end operation 710. While a logical order is shown in FIG. 7, the steps within method 700 may have additional steps or may be conducted in a different sequence. The method 700 can be conducted as one or more computer instructions executed by a computer processor.

The HCM system 202 (FIG. 2) receives a request for information about one or more employees in step 704. The request may be sent from one or more of the user applications operating in a user system 208, 210, and/or 212 (FIG. 2). The request receiver 220 (FIG. 2) of the HCM system 202 (FIG. 2) can receive the request. The request receiver 220 (FIG. 2) determines how to handle the request and to which component to forward the request.

The request receiver 220 (FIG. 2) sends the one or more portions of the request to the parser 216 (FIG. 2). The parser 216 (FIG. 2) determines the data type (e.g., work relationship information, employment terms, and/or assignment information) of the data requested in step 706. The parser 216 (FIG. 2) can parse the request into one or more portions. Each portion of the message may request a different type of data. Alternatively, the two or more types of data may be integrated into a single response that requires two or more types of data. For example, the number of days until the employee is employed two years may be a result of retrieving the employee's start date and mathematically determining the number of days until the next anniversary.

Once the data type is determined, the parser 216 (FIG. 2) can send the request for the data type to the record reader 222 (FIG. 2) to retrieve the employee data from the determined data record in step 708. The record reader 222 (FIG. 2) can access the appropriate data record for the data type. For example, the record reader 222 (FIG. 2) can retrieve data from the work relationship data table 502 or from the employment terms table 510 (FIG. 5). The record reader 222 (FIG. 2) sends the data to the user or presents the user with the data. The record reader 222 (FIG. 2) may compose a response message to the request and send the response to the application executed by the user. In other embodiments, the record reader 222 (FIG. 2) may render a display for a user display device and present the information to the user interface device.

Figure 8:
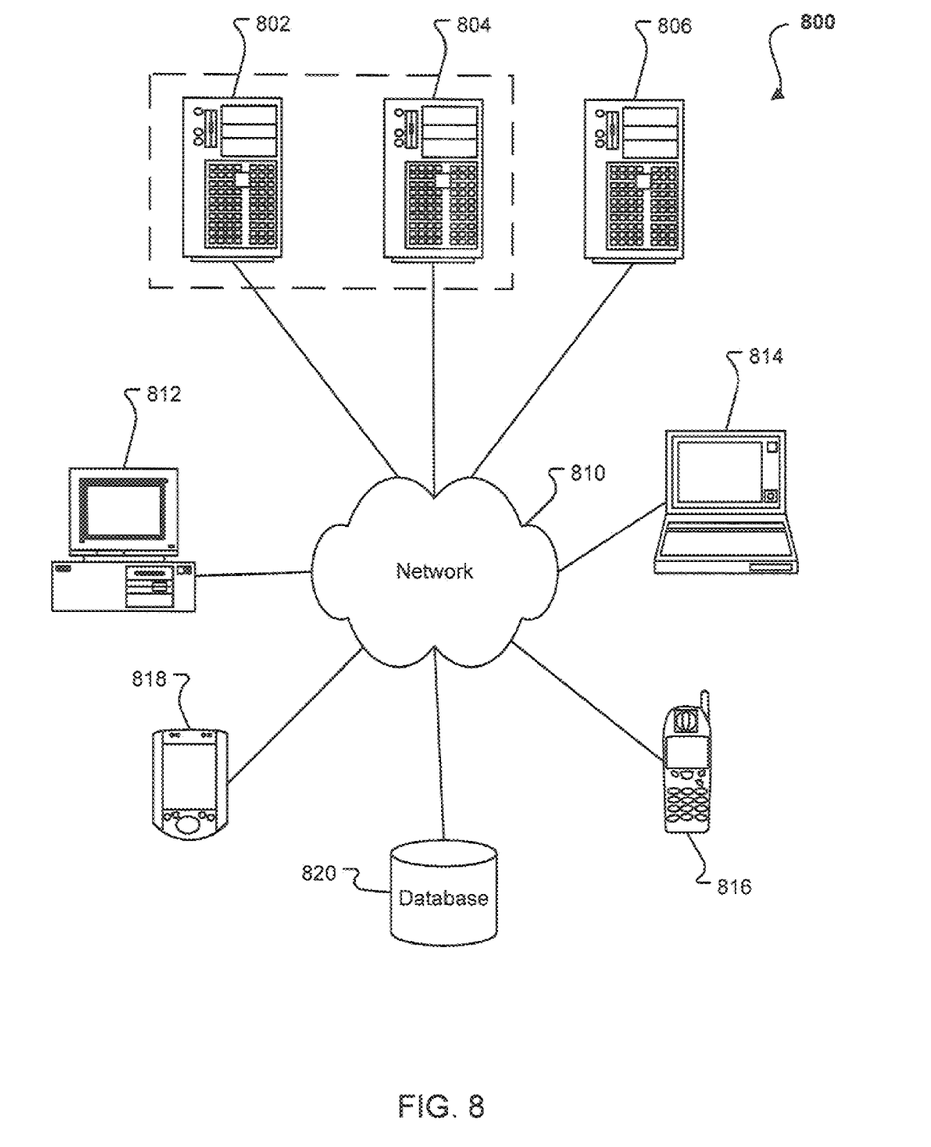
FIG. 8 is a block diagram of an embodiment of a computer network that can be used in one or more embodiments presented herein.

An embodiment of an exemplary operating system 800 is shown in FIG. 8. The various embodiments of the employment data model may be implemented in the exemplary operating environment 800. The system 800 can include one or more user computers, computing devices, or processing devices 812, 814, 816, 818, which can be used to operate a client, such as a dedicated application, web browser, etc. The user computers 812, 814, 816, 818 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 812, 814, 816, 818 may also have any of a variety of applications, including one or more development systems, database client and/or server applications, and Web browser applications. Alternatively, the user computers 812, 814, 816, 818 may be any other electronic device, such as a thin-client computer, Internet-enabled gaming system, and/or personal messaging device, capable of communicating via a network (e.g., the network 810 described below) and/or displaying and navigating Web pages or other types of electronic documents. Although the exemplary system 800 is shown with four user computers, any number of user computers may be supported.

In most embodiments, the system 800 includes some type of network 810. The network may can be any type of network familiar to those skilled in the art that can support data communications using any of a variety of commercially-available protocols, including without limitation TCP/IP, SNA, IPX, AppleTalk™, and the like. Merely by way of example, the network 810 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 802, 804, 806 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 806) may be dedicated to running applications, such as a business application, a Web server, application server, etc. Such servers may be used to process requests from user computers 812, 814, 816, 818. The applications can also include any number of applications for controlling access to resources of the servers 802, 804, 806.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 812, 814, 816, 818. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 812, 814, 816, 818.

The system 800 may also include one or more databases 820. The database(s) 820 may reside in a variety of locations. By way of example, a database 820 may reside on a storage medium local to (and/or resident in) one or more of the computers 802, 804, 806, 812, 814, 816, 818. Alternatively, it may be remote from any or all of the computers 802, 804, 806, 812, 814, 816, 818, and/or in communication (e.g., via the network 810) with one or more of these. In a particular set of embodiments, the database 820 may reside in a storage-area network ("SAN") familiar to those skilled in the art. Similarly, any necessary files for performing the functions attributed to the computers 802, 804, 806, 812, 814, 816, 818 may be stored locally on the respective computer and/or remotely, as appropriate. In one set of embodiments, the database 820 may be a relational database, such as Oracle 10g, that is adapted to store, update, and retrieve data in response to SQL-formatted commands.

Figure 9:
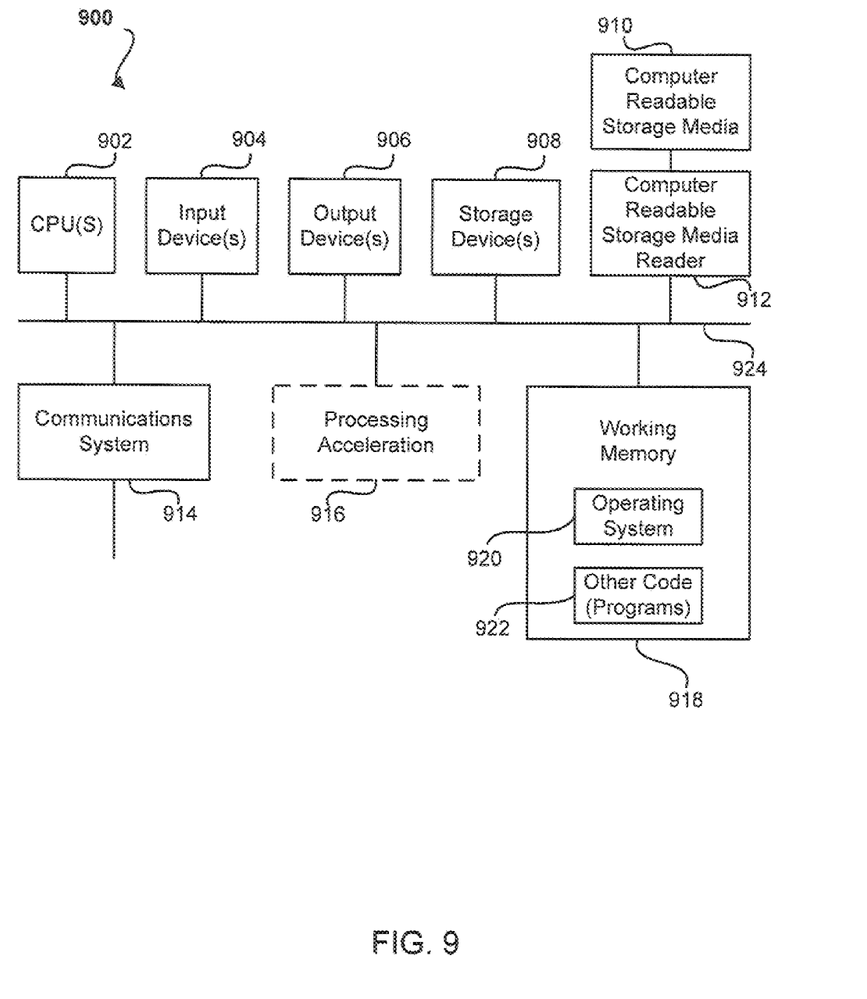
FIG. 9 is a block diagram of an embodiment of a computerized device that can be used in one or more embodiments presented herein.

An embodiment of an exemplary computer system 900, in which various embodiments described herein may be implemented is shown in FIG. 9. The system 900 may be used to implement any of the computer systems described above. The computer system 900 is shown comprising hardware elements that may be electrically coupled via a bus 924. The hardware elements may include one or more central processing units (CPUs) 902, one or more input devices 904 (e.g., a mouse, a keyboard, etc.), and one or more output devices 906 (e.g., a display device, a printer, etc.). The computer system 900 may also include one or more storage devices 908. By way of example, the storage device(s) 908 can include devices such as disk drives, optical storage devices, solid-state storage device such as a random access memory ("RAM") and/or a read-only memory ("ROM"), which can be programmable, flash-updateable and/or the like.

The computer system 900 may additionally include a computer-readable storage media reader 912, a communications system 914 (e.g., a modem, a network card (wireless or wired), an infra-red communication device, etc.), and working memory 918, which may include RAM and ROM devices as described above. In some embodiments, the computer system 900 may also include a processing acceleration unit 916, which can include a digital signal processor DSP, a special-purpose processor, and/or the like.

The computer-readable storage media reader 912 can further be connected to a computer-readable storage medium 910, together (and, optionally, in combination with storage device(s) 908) comprehensively representing remote, local, fixed, and/or removable storage devices plus storage media for temporarily and/or more permanently containing, storing, transmitting, and retrieving computer-readable information. The communications system 914 may permit data to be exchanged with the network and/or any other computer described above with respect to the system 900.

The computer system 900 may also comprise software elements, shown as being currently located within a working memory 918, including an operating system 920 and/or other code 922, such as an application program (which may be a client application, Web browser, mid-tier application, RDBMS, etc.). It should be appreciated that alternate embodiments of a computer system 900 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded as illustrative rather than restrictive. It will, however, be evident that various modifications and changes may be made thereunto without departing from the broader spirit and scope of the invention as set forth in the claims.

What is claimed is:
1. A method in a computer system for managing employee data for an enterprise, comprising:
  providing, by a Human Capital Management (HCM) computer system, a hierarchical employment data model comprising three tiers of data records, the three tiers of data records comprising:
    a top relationship tier comprising one or more relationship data records for each employee of a plurality of employees of a first enterprise, each of the one or more relationship data records storing work relationship information defining a relationship between one employee of the plurality of employees and the first enterprise,
    a middle terms tier below the top relationship tier comprising one or more terms data records, each of the one or more terms data records storing employment terms information for one of the one or more relationship data records of the top relationship tier, and
    a bottom assignment tier below the middle terms tier comprising one or more assignment data records, each of the one or more assignment data records storing assignment information for one of the one or more terms data records in the middle terms tier, wherein defining the hierarchical employment data model for the first enterprise comprises defining a set of fields for employee data records of the first enterprise at each of the top relationship tier, the middle terms tier, and the bottom assignment tier of the hierarchical employment data model;
  receiving, by the HCM computer system, a plurality of employee data, each employee data of the plurality of employee data describing one of the plurality of employees of the first enterprise;
  for each employee data of the plurality of employee data:
    determining, from the employee data, each relationship that an employee described by the employee data has with the first enterprise, each set of terms for each relationship of the employee, and each set of assignments for each set of terms for the employee by:
      parsing, by the HCM computer system, the employee data into one or more portions of the employee data, and
      for each portion of the one or more portions of the employee data:
        identifying, by the HCM computer system, a data type of the portion of the employee data,
        determining, by the HCM computer system, an associated tier for the portion of the employee data based on the data type of the portion of the employee data, the associated tier being one of the top relationship tier, the middle terms tier, and the bottom assignment tier, and
        storing, by the HCM computer system, the portion of the employee data in the associated tier in a data repository configured according to the hierarchical employment data mode;

receiving, by the HCM computer system, a request for information about a first employee of the plurality of employees;

parsing, by the HCM computer system, the request into one or more request portions;

for each request portion of the one or more request portions:
  identifying, by the HCM computer system, a request data type of the request portion,
  determining, by the HCM computer system, an associated request tier for the request portion based on the request data type, the associated request tier being one of the top relationship tier, the middle terms tier, and the bottom assignment tier, and
  retrieving, by the HCM computer system, response employee data from the associated request tier of the data repository;

composing, by the HCM computer system, a response message comprising the retrieved response employee data for each request portion; and transmitting, by the HCM computer system, the response message in response to the request.

2. A method according to claim 1, wherein:
at least one employee of the plurality of employees of the first enterprise has multiple relationships with the first enterprise;
the at least one employee has multiple terms for each of the multiple relationships; and
the at least one employee has multiple assignments for each of the multiple terms.

3. A method according to claim 2, wherein:
a first employment term of the multiple terms for the at least one employee defines an employment condition, a second employment term of the multiple terms for the at least one employee defines a salary, and a third employment term of the multiple terms for the at least one employee defines a grade.

4. A method according to claim 3, wherein:
at least one data record in the middle terms tier is able to be overridden by data from a first data record in the bottom assignment tier.

5. A method according to claim 1, further comprising:
selecting a first data record of the middle terms tier that is fixed and not able to be altered by data from a second data record in the top relationship tier or data from a third data record in the bottom assignment tier.

6. A method according to claim 1, wherein the top relationship tier and the middle terms tier each further comprise rules for governing data storage at any lower tier in the hierarchical employment data model.

7. A method according to claim 1, wherein:
the assignment information comprises information about actual work selected from the group consisting of hours worked, dates, locations, and tasks.

8. A method according to claim 1, wherein:
the work relationship information comprises information selected from the group consisting of start date, hire date, and termination date.

9. A method according to claim 1, further comprising:
storing the relationship data records of the top relationship tier in a first table in the data repository; and
storing both the terms data records of the middle terms tier and the assignment data records of the bottom assignment tier in a second table in the data repository.

10. A method according to claim 9, further comprising:
storing the terms data records and the assignment data records in separate data records of the second table; and
storing a type for each of the terms data records and each of the assignment data records that allows a relationship between associated terms data records and assignment data records to be determined.

11. The method of claim 1, further comprising defining by the HCM computer system a second hierarchical employment data model of a second enterprise comprising a second three tiers of data records, the second three tiers of data records comprising:
a second top relationship tier comprising one or more second relationship data records for each employee of a second plurality of employees of the second enterprise, each of the one or more second relationship data records storing work relationship information defining a relationship between one employee of the second plurality of employees and the second enterprise,
a second middle terms tier below the second top relationship tier comprising one or more second terms data records, each of the one or more second terms data records storing employment terms information for one of the one or more relationship data records of the second top relationship tier, and
a second bottom assignment tier below the second middle terms tier comprising one or more second assignment data records, each of the one or more second assignment data records storing assignment information for one of the one or more second terms data records in the second middle terms tier, wherein defining the second hierarchical employment data model for the second enterprise comprises defining a second set of fields for employee data records of the second enterprise at each of the second top relationship tier, the second middle terms tier, and the second bottom assignment tier of the second hierarchical employment data model and wherein the second set of fields for employee data records of the second enterprise are different from the set of fields for employee data records of the first enterprise.

12. A computer system for managing employee data for an enterprise, comprising:
a processor;
a data repository storing a plurality of employee data records, each of the employee data records stored according to a hierarchical employment data model comprising three tiers of data records, the three tiers of data records comprising:
  a top relationship tier comprising one or more relationship data records for each employee of a plurality of employees of a first enterprise, each of the one or more relationship data records storing work relationship information defining a relationship between one employee of the plurality of employees and the first enterprise,
  a middle terms tier below the top relationship tier comprising one or more terms data records, each of the one or more terms data records storing employment terms information for one of the one or more relationship data records of the top relationship tier, and
  a bottom assignment tier below the middle terms tier comprising one or more assignment data records, each of the one or more assignment data records storing assignment information for one of the one or more terms data records in the middle terms tier, wherein the hierarchical employment data model for the first enterprise by defining one or more fields for employee data records of the first enterprise at each of the top relationship tier, the middle terms tier, and the bottom assignment tier of the hierarchical employment data model; and a memory storing instructions that, when executed by the processor, cause the processor to:
receive a plurality of employee data, each employee data of the plurality of employee data describing one of the plurality of employees of the first enterprise;
for each employee data of the plurality of employee data:
determine from the employee data each relationship that an employee described by the employee data has with the first enterprise, each set of terms for each relationship of the employee, and each set of assignments for each set of terms for the employee by:
parsing the employee data into one or more portions of the employee data, and
for each portion of the one or more portions of the employee data:
identify a data type of the portion of the employee data,
determine an associated tier for the portion of the employee data based on the data type of the portion of the employee data, the associated tier being one of the top relationship tier, the middle terms tier, and the bottom assignment tier, and
store the portion of the employee data in the associated tier in the data repository;
receive a request for information about a first employee of the plurality of employees;
parse the request into one or more request portions;
for each request portion of the one or more request portions:
identify a request data type of the request portion,
determine an associated request tier for the request portion based on the request data type, the associated request tier being one of the top relationship tier, the middle terms tier, and the bottom assignment tier, and
retrieve response employee data from the associated request tier of the data repository;
composing a response message comprising the retrieved response employee data for each request portion; and
transmit the response message in response to the request.

13. A system according to claim 12, wherein:
at least one employee of the plurality of employees of the first enterprise has multiple relationships with the first enterprise;
the at least one employee has multiple terms for each of the multiple relationships; and
the at least one employee has multiple assignments for each of the multiple terms.

14. A system according to claim 13, wherein:
at least one data record in the middle terms tier is able to be overridden by data from a first data record in the bottom assignment tier.

15. A system according to claim 14, further comprising:
selecting a first data record of the middle terms tier that is fixed and not able to be altered by data from a second data record in the top relationship tier or data from a third data record in the bottom assignment tier.

16. A system according to claim 12, wherein the top relationship tier and the middle terms tier each further comprise rules for governing data storage at any lower tier in the hierarchical employment data model.

17. A method, comprising:
storing employment data for an enterprise in a database according to a three-tier model, the database comprising:
a first table storing data associated with a first tier of the three-tier model, the data stored by the first table identifying one or more relationships between an employee and the enterprise,
a second table storing data associated with a second tier of the three-tier model, the data stored by the second table identifying, for each relationship in the one or more relationships, one or more employment terms associated with the relationship, and
a third table storing data associated with a third tier of the three-tier model, the data stored by the third table identifying, for each employment term in the one or more employment terms, one or more assignments associated with the employment term;
receiving, by a computer system, employee information for a first employee;
determining, by the computer system by parsing the employee information, that the employee information comprises a first data portion, a second data portion, and a third data portion;
determining, by the computer system, a first type of data associated with the first data portion;
determining, by the computer system, a second type of data associated with the second data portion and the third data portion, wherein the second type of data is different from the first type of data;
determining, by the computer system, based upon the first type of data, a table from among the first, second, and third tables for storing the first data portion;
determining, by the computer system, based upon the second type of data, a table from among the first, second, and third tables for storing the second and third data portions, wherein the table determined based upon the first type of data and the table determined based upon the second type of data are associated with different tiers of the three-tier model;
storing the first data portion in a record in the table determined based upon the first type of data;
storing the second data portion in a record in the table determined based upon the second type of data;
storing the third data portion in a record in the table determined based upon the second type of data;
storing a one-to-many relationship between the record in the first particular table storing the first data portion and the records in the second particular table storing the second and third data portions;
receiving, by the computer system, a request for information about the first employee;
determining, by the computer system by parsing the request, that the request comprises a first request portion and a second request portion, the first request portion requesting the first type of data for the first employee and the second request portion requesting the second type of data for the first employee;
determining, by the computer system, based upon the second type of data, a table from among the first, second, and third tables for responding to the second request portion, wherein the table determined based upon the first type of data and the table determined based upon the second type of data are associated with different tiers of the three-tier model;

retrieving, by the computer system, first response data for the first request portion from the table determined based upon the first type of data;

retrieving, by the computer system, second response data for the second request portion from the table determined based upon the second type of data;

composing, by the computer system, a response message comprising the first response data and the second response data; and transmitting, by the computer system, the response message as a response to the request.

18. The method of claim 17, wherein:

the first employee has multiple relationships with the enterprise;

the first employee has multiple terms for each of the multiple relationships; and the first employee has multiple assignments for each of the multiple terms.

19. The method of claim 18, wherein:

at least one data record in the second table is able to be overridden by data from an assignment data record in the third table.

20. The method of claim 19, further comprising:

selecting a first data record from the second table that is fixed and not able to be altered by data from a second data record in the first table or data from a third data record in the third table.

21. The method of claim 17, wherein the first tier and the second tier each further comprise rules for governing data storage at any lower tier in the three-tier model.

* * * * *

UNITED STATES PATENT AND TRADEMARK OFFICE
CERTIFICATE OF CORRECTION

PATENT NO. : 9,727,830 B2
APPLICATION NO. : 12/268836
DATED : August 8, 2017
INVENTOR(S) : Gonzalez et al.

Page 1 of 1

It is certified that error appears in the above-identified patent and that said Letters Patent is hereby corrected as shown below:

In the Specification

In Column 10, Line 18, delete "GRPS," and insert -- GPRS, --, therefor.

In the Claims

In Column 13, Line 2, in Claim 1, delete "mode;" and insert -- model; --, therefor.

Signed and Sealed this
Twentieth Day of February, 2018

Andrei Iancu
*Director of the United States Patent and Trademark Office*